United States Patent [19]

Edixhoven

[11] Patent Number: 4,514,886

[45] Date of Patent: May 7, 1985

[54] UNIT FOR POSITIONING A VENETIAN BLIND LADDER AND FOR GUIDING THE SLATS OF THE BLIND THEREONTO

[75] Inventor: Gerardus H. Edixhoven, Voorschoten, Netherlands

[73] Assignee: Hunter Douglas International N.V., Curacao, Netherlands Antilles

[21] Appl. No.: 506,352

[22] Filed: Jun. 21, 1983

[30] Foreign Application Priority Data

Jul. 23, 1982 [GB] United Kingdom ................. 8221403

[51] Int. Cl.³ ............................................ B23P 19/04

[52] U.S. Cl. ...................................................... 29/24.5

[58] Field of Search ......................................... 29/24.5

[56] References Cited

U.S. PATENT DOCUMENTS

| | | |
|---|---|---|
| 3,521,337 | 7/1970 | Peeters . |
| 4,073,044 | 2/1978 | Edixhoven . |
| 4,188,693 | 2/1980 | Edixhoven . |

*Primary Examiner*—Howard N. Goldberg
*Assistant Examiner*—Steven Nichols
*Attorney, Agent, or Firm*—Pennie & Edmonds

[57] ABSTRACT

A unit for positioning a venetian blind ladder tape and for guiding the slats of a blind between individual rungs of a rung pair of a ladder tape, said unit comprising two body portions, a guiding member on each body portion, each guiding member locating, for movement longitudinally of the guiding member, one of the side tapes of the ladder tape and permitting the rungs to extend to the other side tape, the body portions being resiliently urged apart by a spring to tension the rungs. Each body portion carries a slat guide element which is positioned to feed slat material between the rungs of a pair and a resiliently retractable abutment plate is located adjacent each slat guide element, so as to engage the rung of a pair nearer thereto. The ladder tape is fed intermittently forward and is urged rearwardly between intermittent advances by spring-urged parts, so that the nearer rung of a pair is engaged against the abutment.

12 Claims, 6 Drawing Figures

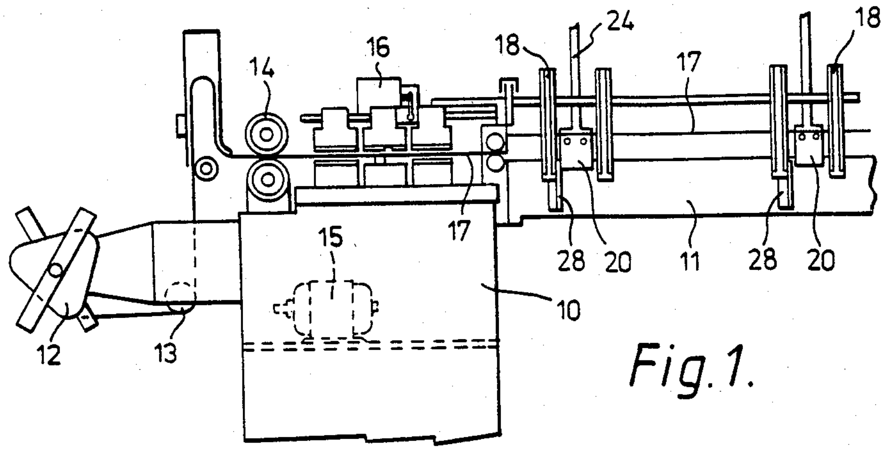
Fig. 1.
Fig. 2.
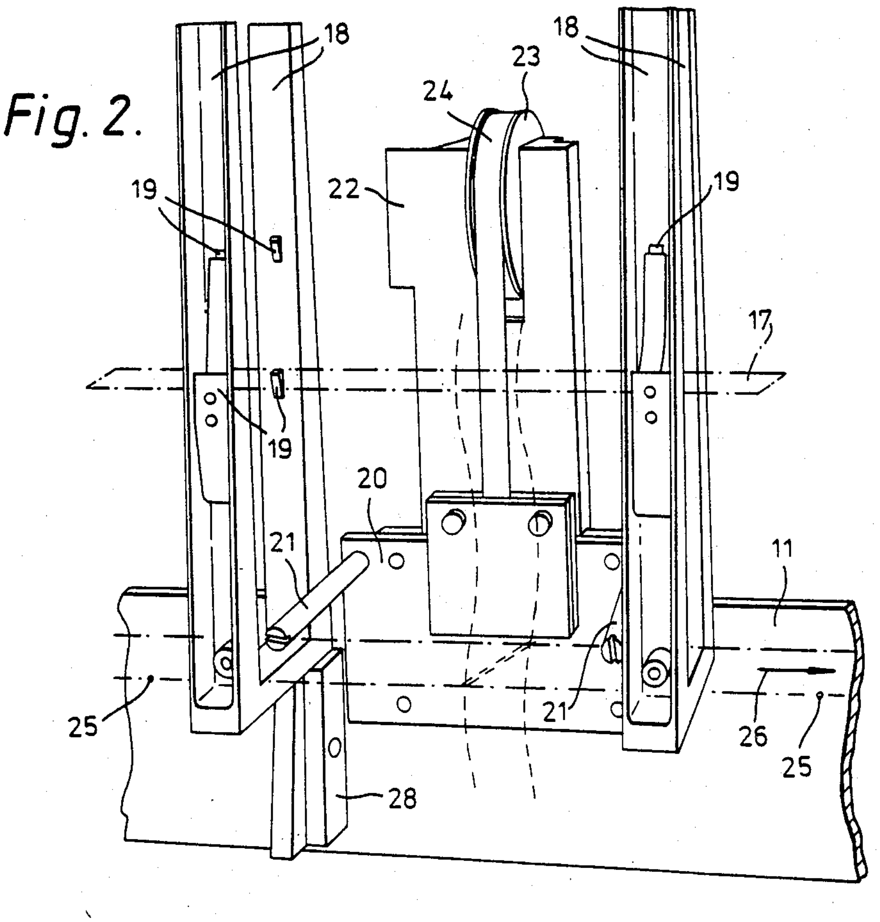

Fig. 3.
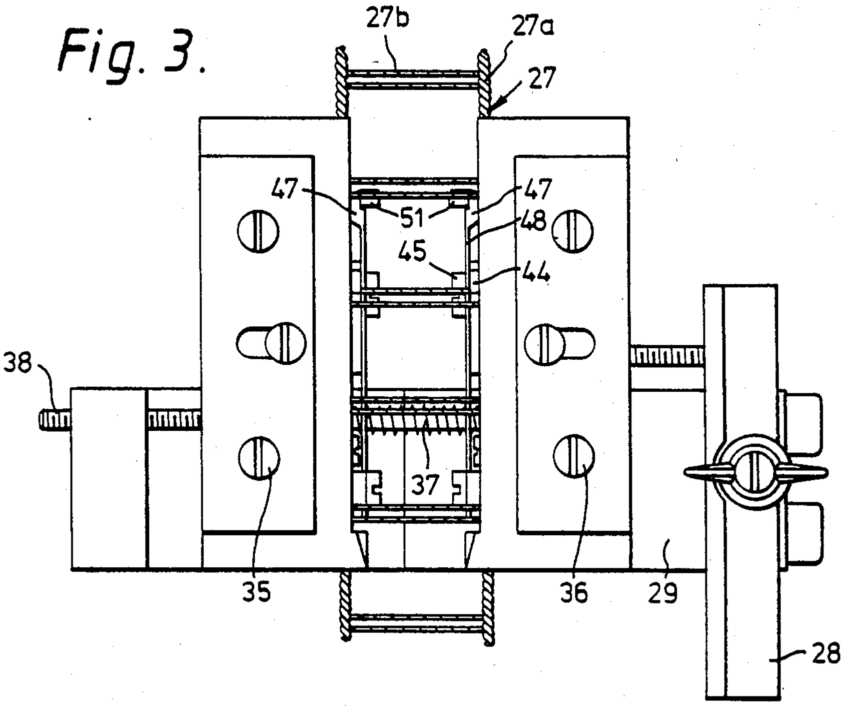
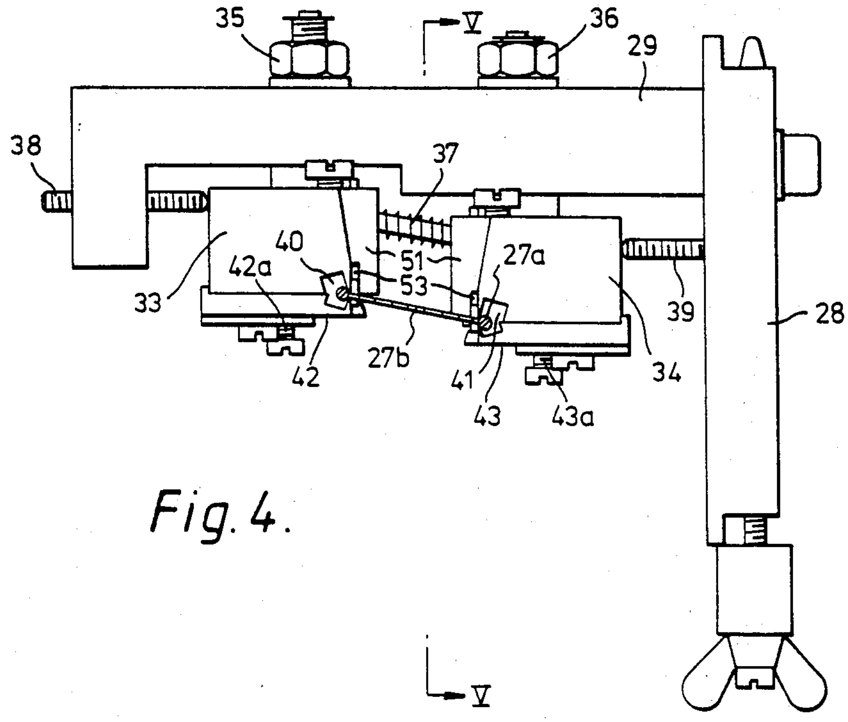
Fig. 4.

UNIT FOR POSITIONING A VENETIAN BLIND LADDER AND FOR GUIDING THE SLATS OF THE BLIND THEREONTO

DESCRIPTION

The present invention relates to a unit for positioning a venetian blind ladder tape and for guiding the slats of a blind between the individual rungs of a rung pair of the ladder tape.

Various proposals have been made for insertion of the slats between the double rungs of a venetian blind ladder tape, and these have usually involved some form of spreader which pulls the side tapes apart. A guide is provided to enable the slat material to the slid into place. Proposals have been made to arrange for the rungs to be angled with respect to the leading edge of the slat, to facilitate entry of this leading edge between the rungs of a rung pair.

Unfortunately, none of these proposals is entirely satisfactory, because it has not been possible to obtain a maximum opening in the width direction between the stretched rungs of a pair at the point where the slat is being inserted.

It is now proposed, according to the present invention, to provide a unit for positioning a venetian blind ladder tape and for guiding the slat material or individual slats for a blind between the individual rungs of a rung pair of the ladder tape, said unit comprising two body portions, a guiding member on each body portion, each guiding member locating, for movement longitudinally of the guiding member, one of the side tapes of the ladder tape and permitting the rungs to extend to the side tape located by the other guiding member, means resiliently urging said body portions apart from one another, to tension the rungs, a slat guide element positioned to feed a slat or slat material between the rungs of a pair, an abutment located adjacent said slat guide element so as to be engaged by the rung of a pair nearer thereto, means to advance the ladder tape intermittently forward longitudinally of sai guiding member and means to urge the ladder tape in a reverse direction between intermittent advances, so that said nearer rung of a pair is engaged against said abutment and the rung pair is accurately positioned thereby relative to said slat guide element, for insertion of a slat or slat material.

Such a construction enables the rungs to be positioned very accurately, one of the rungs of a pair being located by the abutment in exactly the correct position relative to the slat guide element so that the slat is led straight into the gap between the two rungs. In order to facilitate this, the abutment is preferably located in a plane displaced upstream of the surface of the slat guide element, by an amount to accommodate the thickness of said nearer rng of a rung pair, so that the surface of the feed element is accurately positioned at the level of the rung surface which will touch the slat when it has been inserted. This enables the rungs to be tensioned by the resilient urging of the body portions away from one another by a maximum amount, this again ensuring ease of introduction. Advantageously, the top surface of the or each abutment is angled downwardly and outwardly, to receive the tips of the concave surface of the slat or slat material.

The present invention is particularly suitable for use with ladder tape which is made to a fine tolerance. The end product will then have slats which are firmly held both laterally and vertically, and it may not be necessary to include any means to fix the slats in place.

Desirably the means to urge the ladder tape in a reverse direction comprises at least one pawl which is resiliently engageable with a rung or rung pair upstream of the abutment and preferably each body portion has a pawl mounted thereon and a spring urging the pawl in a direction to engage the next rung or rung pair upstream of the abutment at a location of the rung pair adjacent the side tape passing through the guide member on that body portion. This ensures that the reverse urging of the ladder tape is carried out in the most effective manner.

While it is contemplated that there should be only one abutment and one slat guide, preferably an abutment and a slat guide are provided on each body portion.

Again while the abutment or the abutments may be fixed the or each abutment is preferably retractable in a direction transverse to the direction of forward movement of the ladder tape, to enable a rung pair to pass the or each abutment readily during forward movement of the ladder tape. Advantageously, the abutment or abutments are resiliently retractable and are provided with an inclined surface engageable by the rungs during forward movement of the ladder tape, such engagement causing the or each abutment to retract. The abutments are desirably mounted on a torsion bar which flexes to allow retraction of the abutment which is preferably in the form of a plate which is movable in a rebate slot formed in the slat guide element adjacent the associated body portion.

The guiding members may each comprise a groove in the body portion and a spring-urged plate positioned to overlie the groove, spaced from the body portion by a distance to allow the passage of the rungs, the plate being movable back against the spring action to expose the groove to enable the side tapes to be introduced into the grooves. Such a construction facilitates greatly the introduction of a new ladder tape into the unit.

Preferably the guiding members are offset with respect to one another in the place of slat feed, so that the rungs of a rung pair are inclined at an angle other than a right angle to the direction of feed of the slats that are guided into the slat feed element. This assists in introducing a slat within the rungs of a rung pair, since a corner of the slat will be introduced first rather than the full leading edge of the slat.

In order that the present invention may more readily be understood, the following description is given, merely by way of example, reference being made to the accompanying drawings in which:

FIG. 1 is a diagrammatic illustration of an installation for mechanically producing venetian blinds and provided with a unit in accordance with the invention;

FIG. 2 is a perspective view on a larger scale of part of the FIG. 1 installation for one of the several working stations;

FIG. 3 is a front elevation of one embodiment of unit according to the invention;

FIG. 4 is a plan view of the unit of FIG. 3;

Figure 5:
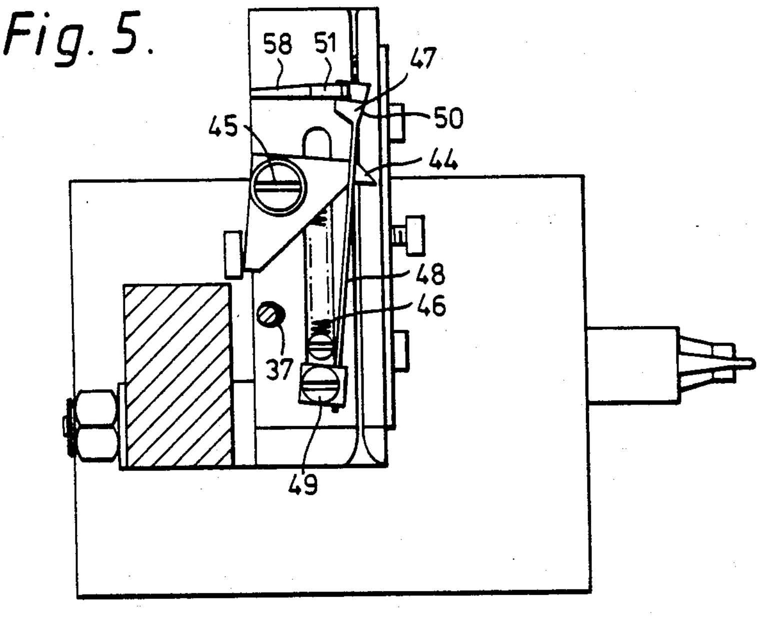
FIG. 5 is a section taken along the line V—V of FIG. 4.
Figure 6:
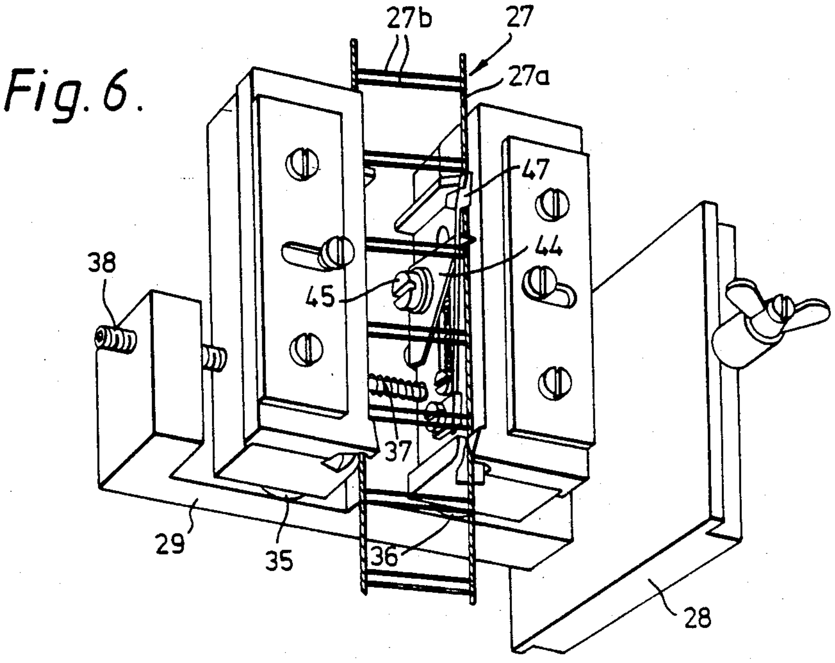
FIG. 6 is a perspective view of the unit of FIGS. 3 to 5.

The portion of the installation for mechanically producing venetian blinds, illustrated in FIG. 1, comprises a machine bench 10 and an assembly stand 11. Secured to the machine bench 10 is a supply drum 12 from which slat forming strip is fed. The strip is passed over rollers 13 to a first pair of feed rolls 14 which are driven by a motor 15. The sheet metal slat forming strip then passes through a device 16 within which it is straightened and shaped. Also in the device 16, the orifices necessary for affording passage to a lifting element are punched out, and the sheet metal strip is cut up to the required lengths for forming slats 17. However, the parts directly connected to the machine bench 10 do not form part of the invention.

The assembly stand 11 comprises a plurality of stations. The number of these stations will depend upon particular requirements, especially upon the specific length of slat or width of the blind to be produced. In each station a ladder carrying and guiding the several slats is assembled, as is a lifting element. The feeding of this latter element is not described since it does not form part of the invention.

Associated with each station on the assembly stand 11 are two vertical U-shaped holders 18, the gap between the limbs of each of which is slightly greater than the width of the slat 17. Provided on the inner faces of the holders 18 are resilient stops 19, which are arranged opposite each other in pairs and which, when a slat 17 passes upwardly over them, can be moved into the interior of the holders 18. After a slat 17 has passed through, the stops 19 move into the projecting position again, so that the slat 17 in question, or a stack formed by a number of slats 17, can bear on the four stops associates with the two holders 18. In the present case, such stops 19 can each be arranged at different levels on the holders 18.

For the purpose of moving the individual slats 17 upwards in the vertical direction, use is made of two pins 21 secured to a plate 20. The plate 20 is guided, in a manner not illustrated, on a support 22, at the upper end of which is mounted a roller 23. Bolts 24, secured to the plate 20, passes over this roller so that the plate 20, and with it the pins 21, can be raised or lowered in the vertical direction by means of a drive, not illustrated.

The strip from which the slats 17 are cut is guided in a feed plane 25 illustrated by dash-dot lines in FIG. 2, and the direction of feed is indicated by the arrow 26 and coincides with the direction in which the longitudinal axis of the slats extend. However, in FIG. 2, the apparatus in accordance with the invention is not illustrated in detail, so as to enable the construction of a station to be shown in a clearer manner. It can be seen, however, that the slats 17 are carried and guided by a ladder 27 which comprises two cords 27*a*, a series of double rungs 27*b* (see FIG. 3) consisting of upper and lower rung members. The cords 27*a* are of a diameter that is greater than that of the cords forming the upper and lower rungs 27*b*.

There now follows a description of the construction of the unit illustrated in FIGS. 3 to 6, which is used for inserting the slats 17 between each pair of upper and lower rungs 27*b* of the ladder 27, which apparatus is secured in a suitable manner to the assembly stand 11 in the zone of the ladder 27. The apparatus can be secured by means of a retaining plate 28 on which it is adjustable in the lateral and/or vertical direction. Extending transversely of the retaining plate 28 is a carrier plate 29, on which are pivotally mounted two body portions 33 and 34 on pivots 35 and 36 respectively. The two body portions are resiliently urged apart from one another by a coil spring 37 and the maximum spacing is determined by two abutment screws 38 and 39.

The body portions 33 and 34 are provided with guiding grooves 40, 41 which extend longitudinally of the body portions. Guide plates 42 and 43 respectively are mounted to cover the grooves 40 and 41 but can be pulled back against the action of a spring (42*a*, 43*a*) to expose the groove so that a ladder tape side cord 27*a* can be introduced into each of the grooves. Thereafter the plates 42, 43 are released so that the side cords are held in place. There is a sufficient gap between the rear surface of the plates 42, 43 to allow the rungs 27*b* to pass between the plate and the body portion 33, 34. This arrangement therefore provides, on the body portions, guiding members which extend longitudinally substantially parallel to one another. There is a slight divergence caused by the action of the spring 37 urging the body portions away from one another.

Each body portion has pivotally mounted thereon a pawl 44 secured to the body portion by a pivot pin 45 and urged, in a clockwise direction as seen in FIG. 5 by a coil spring 46. Also mounted on each body member is an abutment plate 47 which is carried by a torsion bar 48 secured to the body portion by a bolt 49. The abutment plate 47 is movable from left to right as seen in FIG. 5, its natural position being as shown with the forward edge face 50, which is inclined, protruding forwardly of a slat guide plate 51. This slat guide has an upper surface 58 which is slightly convexly curved and extends slightly above the outer edge of the top surface of the abutment plate 47, by an amount which is equal to the thickness of one of the rungs 27*b*. The plate 47 is movable in a rebate slot 53 formed adjacent the body portion and the slat guide plate 51.

In use, the ladder tape is inserted into the grooves 40, 41 as described above and is held in place by the plates 42, 43. The ladder tape can then be advanced upwardly, that is in a forward direction of movement. The means for doing this are as described earlier, that is to say the pins 21 which, when raised, will contact a slat and move the whole assembly including the latter tape upwardly or forwardly in an intermittent manner. As the ladder tape is raised, the rungs 27*b* will, in turn, press against the front edge 50 of the abutment plate and urge the plate rearwardly against the action of the torsion bar mounting 48. Immediately a rung has passed above the abutment plate, this plate will move back under the resilient action of the torsion bar and, by this time, the next succeeding rung will be engaged by the pawl 44, which is urged downwardly by the spring 49. Because of the action of the pawl on the rung 27*b* which is immediately upstream (that is below) the abutment plate, the ladder tape will be urged in the reverse direction, that is downwardly. Since, by this time, the ladder tape will have advanced, the abutments plate 47 will be able to catch the nearer rung 27*b*, that is the lower rung of a rung pair. Because of the spacing below of the outer part of the upper surface of the abutment plate beneath the upper surface of the slat guide, the upper surface of the slat guide will, in effect, be exactly opposite the upper surface of the lower rung of a rung pair. Thereafter the slat can be introduced in the manner described previously so that it passes between the two rungs of a rung pair.

Such an arrangement, therefore, ensures that the rungs are very accurately positioned prior to the slat material being introduced. This means that very fine tolerance ladder tapes can be used and these enable one to insert slats which are closely adapted to the spacing between the rungs and the spacing between the side cords of the ladder tape, thus ensuring that the slats are held firmly in place. Furthermore, it will enable one to ensure that the orientation of the slats is always maintained by the ladder tape. This is particularly important when one is dealing with very thin and narrow slat material, such as is used between glass in a double or treble glazed window.

While the abutment plate has been shown as being spring-urged to its forward position, means could be provided to move the abutment in sequence with the advancing movement of the ladder tape. Similarly, while pawls have been shown to provide the rearward urging of the ladder tape, other means are contemplated, for example, a weight could simply be hung on the ladder tape or the ladder tape could be unwound from a spring-urged roller.

I claim:

1. A unit for positioning a venetian blind ladder tape and for guiding slat material or individual slats for a blind between the individual rungs of a rung pair of the ladder tape, said unit comprising two body portions, a guiding member on each body portion, each guiding member locating, for movement longitudinally of the guiding member, one of the side tapes of the ladder tape and permitting the rungs to extend to the side tape located by the other guiding member, means resiliently urging said body portions apart from one another to tension the rungs, a slat guide element positioned to feed a slat or slat material between the rungs of a pair, an abutment located adjacent said slat guide element so as to be engaged by the rung of a pair nearer thereto, means to advance the ladder tape intermittently forward longitudinally of said guiding member and means to urge the ladder tape in a reverse direction between intermittent advances so that said nearer rung of a pair is engaged against said abutment and the rung pair is accurately positioned thereby relative to said slat guide element for insertion of a slat or slat material.

2. A unit according to claim 1, wherein the means to urge ladder tape in a reverse direction comprise at least one resiliently mounted pawl engageable with a rung or rung pair upstream of the abutment.

3. A unit according to claim 2, wherein each of said body portions has a pawl mounted thereon and a spring urging the pawl in a direction to engage the next rung or rung pair upstream of said abutment at a location of said rung pair adjacent the side tape passing through the guiding member on that body portion.

4. A unit according to claim 1, 2 or 3, wherein there is an abutment and a slat guide on each body portion.

5. A unit according to claim 1, wherein said abutment is located in a plane displaced upstream of the surface of the slat guide element by an amount to accommodate the thickness of said nearer rung of a rung pair, so that the surface of the feed element feeds a slat accurately between the rungs of a pair.

6. A unit according to claim 5, wherein the top surface of said abutment is angled downwardly and outwardly, to receive the tips of the concave surface of the slat or slat material resiliently retractable.

7. A unit according to claim 1, wherein said abutment is resiliently retractable in a direction transverse to the direction of forward movement of the ladder tape, to enable a rung pair to pass the or each abutment readily during forward movement of the ladder tape.

8. A unit according to claim 7, wherein said abutment is provided with an inclined surface engageable by the rungs during forward movement of the ladder tape, such engagement causing the or each abutment to retract.

9. A unit according to claim 7 or 8, wherein said abutment is mounted on a torsion bar which flexes to allow retraction of the abutment.

10. A unit according to claim 6, 7, or 8, wherein said abutment is in the form of a plate movable in a rebate slot formed in the slat guide element adjacent the associated body portion.

11. A unit according to claim 1, wherein the guiding members each comprise a groove in the body portion and a spring-urged plate positioned to overlie the groove, and spaced from the body portion by a distance to allow the passage of the rungs, the plate being movable back against the spring action to expose the groove to enable the side tapes to be introduced into the grooves.

12. A unit according to claim 1, wherein the guiding members are offset with respect to one another in the plane of slat feed, so that the rungs of a rung pair are inclined at an angle other than a right angle to the direction of feed of the slats which are guided on the slat feed element.

* * * * *